(12) United States Patent
Beauchemin (10) Patent No.: US 8,780,223 B2
(45) Date of Patent: Jul. 15, 2014

(54) AUTOMATIC DETERMINATION OF COMPLIANCE OF A PART WITH A REFERENCE DRAWING

(75) Inventor: Patrick Beauchemin, Pointe-Claire (CA)

(73) Assignee: Visionx Inc., Quebec (CA)

( * ) Notice: Subject to any disclaimer, the term of this patent is extended or adjusted under 35 U.S.C. 154(b) by 624 days.

(21) Appl. No.: 13/077,762

(22) Filed: Mar. 31, 2011

(65) Prior Publication Data

US 2012/0249820 A1 Oct. 4, 2012

(51) Int. Cl.
*H04N 5/228* (2006.01)
*G06F 17/50* (2006.01)

(52) U.S. Cl.
USPC .......................................... 348/222.1; 703/1

(58) Field of Classification Search
USPC .............................. 382/113; 703/1; 348/222.1
See application file for complete search history.

(56) References Cited

U.S. PATENT DOCUMENTS

| | | | |
|---|---|---|---|
| 5,657,395 A | 8/1997 | Hirota | |
| 2010/0087940 A1* | 4/2010 | Sims et al. | 700/98 |
| 2010/0110264 A1* | 5/2010 | Carroll | 348/333.01 |
| 2010/0225666 A1 | 9/2010 | Beauchemin | |

FOREIGN PATENT DOCUMENTS

| | | |
|---|---|---|
| CA | 2106146 A1 | 4/1994 |
| WO | 2010099604 A1 | 9/2010 |

OTHER PUBLICATIONS

VisionX (Oct. 29, 2010) Digital Optical Comparators/Digital Profile Projectors, Downloaded from Internet Archive: http://web.archive.org/web/20101029041137/http://www.visionx.
Ailisto (May 15, 1997) CAD and Vision in Rangefinder-based Dimensional Metrology, International Conference on Recent Advances in 3-D Digital Imaging and Modeling, 1997. pp. 25.
International PCT Search Report issued on Dec. 7, 2011 for PCT/CA2011/000337.

* cited by examiner

*Primary Examiner* — Mekonnen Dagnew
(74) *Attorney, Agent, or Firm* — Baker & Hostetler LLP (57) ABSTRACT

A system for visually comparing a part to a drawing of said part in computer memory or on a screen is provided. The system includes a camera for capturing either a single image or an image stream of the part, a computing module for receiving the image or image stream, for obtaining, scaling, positioning and displaying the drawing of the part on a display unit and for overlaying the drawing on the image or image stream. The system determines if the part is manufactured within predefined tolerances at least one control section. In use, a user defines at least one control section and the system performs a CAD-space to image-space transformation of each control section. A deviation between the CAD drawing and the part at each control section is calculated, and this deviation is indicated to the user. The deviation is compared to a predetermined tolerance in order to determine if the part at each control section is within the predetermined tolerance; and a pass/fail indication is determined based on the comparison. For more complex shapes, a user can select an entire geometrical shape, and the system automatically determines a plurality of control sections within the geometric shape, in order to provide the user with a shape pass/fail indication.

17 Claims, 9 Drawing Sheets

AUTOMATIC DETERMINATION OF COMPLIANCE OF A PART WITH A REFERENCE DRAWING

FIELD OF THE INVENTION

The present invention relates to a system and method for automatically determining if a part is within a predetermined tolerance, either in a control section, or for the whole part.

BACKGROUND OF THE INVENTION

In manufacturing processes, it is almost always necessary to perform quality control on a part so manufactured. In some cases, this quality control will permit the manufacturer to sell the part for a better price if the part is within tighter tolerances. Additionally, in some industries such as the aerospace industry, or the electronics industry, parts will be rejected if they are not manufactured to strict tolerances.

In the past, a comparison of the part to engineering drawings has been done manually or through vision systems, but using a paper copy of the drawings, with the inherent disadvantages that this may entail.

The Assignee of the present application has filed International Patent Application No. PCT/CA2010/000295 (published as WO 2010/099604 A1 on Sep. 10, 2010), directed to a system and method for overlaying an image of a drawing to an image of the part, on a screen. Two of the many advantages of this system are that scaling of the drawing can be done using conventional image manipulation techniques, and also that the alignment of the drawing and the part can be performed either manually or automatically.

SUMMARY OF THE INVENTION

A system and method for automatically determining if a part is within tolerances is provided.

In accordance with one embodiment of the invention, there is provided, in a system for visually comparing a part to a drawing of said part in computer memory or on a screen, the system comprising a camera for capturing either a single image or an image stream of said part, a computing module for receiving the image or image stream, for obtaining, scaling, positioning displaying said drawing of said part on a display unit and for overlaying the drawing on the image or image stream, a method for determining if a part is manufactured within predefined tolerances at least one control section, the method comprising the steps of:

a. defining at least one control section, and for each control section determining the geometry thereof;
b. performing a CAD-space to image-space transformation of each control section;
c. calculating a deviation between the CAD drawing and the part at each control section;
d. providing a user with an indication of the deviation between the CAD drawing and the part at each control section;
e. comparing the deviation to a predetermined tolerance in order to determine if the part at each control section is within the predetermined tolerance; and
f. providing a user with an indication of the determination of each control section being within the predetermined tolerance.

In accordance with another embodiment of the invention, there is provided, in a system for visually comparing a part to a drawing of said part in computer memory or on a screen, the system comprising a camera for capturing either a single image or an image stream of said part, a computing module for receiving the image or image stream, for obtaining, scaling, positioning and displaying said drawing of said part on a display unit and for overlaying the drawing on the image or image stream, a method for determining if a part is manufactured within predefined tolerances at at least one geometric object, the method comprising the steps of:

a. defining at least one geometric entity, and for each entity defining a geometry thereof, said geometry including a density coefficient;
b. defining a plurality of virtual control sections within each of said geometric entity, said plurality of virtual control sections being a function of said density coefficient;
c. for each virtual control section, determining the geometry thereof;
d. performing a CAD-space to image-space transformation of each virtual control section;
e. calculating a deviation between the CAD drawing and the part at each virtual control section;
f. providing the user with either an indication of the deviation between the CAD drawing and the part at each virtual control section or an indication of the minimum and maximum deviations between the CAD drawing and the part over the geometric entity and the location on the geometric entity of these minimum and maximum deviations;
g. comparing the deviation to a predetermined tolerance in order to determine if the part at each virtual control section is within the predetermined tolerance; and
h. providing a user with an indication of the determination of each virtual control section being within the predetermined tolerance.

In accordance with yet another embodiment of the invention, there is provided a system for visually comparing a part to a drawing of said part, the system being adapted to receive a single image or an image stream of said part, said system comprising:

a module for receiving the image or image stream, for obtaining, scaling, positioning and displaying said drawing of said part on a display unit and for overlaying the drawing on the image or image stream, a method for determining if a part is manufactured within predefined tolerances at least one control section;
an input device for defining at least one control section on at least one point of said part, and for each control section determining the geometry thereof;
a calculating module for performing a CAD-space to image-space transformation of each control section;
a calculating module for calculating a deviation between the CAD drawing and the part at each control section;
an output device for providing a user with an indication of the deviation between the CAD drawing and the part at each control section;
a comparator for comparing the deviation to a predetermined tolerance in order to determine if the part at each control section is within the predetermined tolerance,
wherein said output device provides a user with an indication of the determination of each control section being within the predetermined tolerance.

In accordance with yet another embodiment of the invention, there is provided a system for visually comparing a part to a drawing of said part in computer memory or on a screen, the system being adapted to receive a single image or an image stream of said part, said system comprising:

a module for receiving the image or image stream, for obtaining, scaling, positioning and displaying said drawing of said part on a display unit and for overlaying the drawing on the image or image stream;

an input device for defining at least one geometric entity, and for each entity defining a geometry thereof, said geometry including a density coefficient;

means for defining a plurality of virtual control sections within each of said geometric entity, said plurality of virtual control sections being a function of said density coefficient;

for each virtual control section, means for determining the geometry thereof;

means for performing a CAD-space to image-space transformation of each virtual control section;

means for calculating a deviation between the CAD drawing and the part at each virtual control section;

means for providing the user with either an indication of the deviation between the CAD drawing and the part at each virtual control section or an indication of the minimum and maximum deviations between the CAD drawing and the part over the geometric entity and the location on the geometric entity of these minimum and maximum deviations;

means for comparing the deviation to a predetermined tolerance in order to determine if the part at each virtual control section is within the predetermined tolerance; and means for providing a user with an indication of the determination of each virtual control section being within the predetermined tolerance.

In accordance with yet another embodiment of the invention, there is provided, in a system for comparing a part to a drawing of said part, the system comprising a camera for capturing either a single image or an image stream of said part, a computing module for receiving the image or image stream, for obtaining, scaling, and positioning said drawing of said part and for overlaying the drawing on the image or image stream, a method for determining if a part is manufactured within predefined tolerances at least one control section, the method comprising the steps of:

a. defining at least one control section, and for each control section determining the geometry thereof;

b. performing a CAD-space to image-space transformation of each control section;

c. calculating a deviation between the CAD drawing and the part at each control section;

d. providing an indication of the deviation between the CAD drawing and the part at each control section; and e. comparing the deviation to a predetermined tolerance in order to determine if the part at each control section is within the predetermined tolerance.

BRIEF DESCRIPTION OF THE DRAWINGS

The present invention will be better understood after reading a description of a preferred embodiment thereof, made in reference to the following drawings, in which.

DETAILED DESCRIPTION

The present invention finds particular use in an imaging system that is capable of overlaying a part's appropriately scaled, translated and rotated CAD data on top of the live or still video image of the part. Of course, the present invention can be used in all computerized imaging systems.

Figure 15:
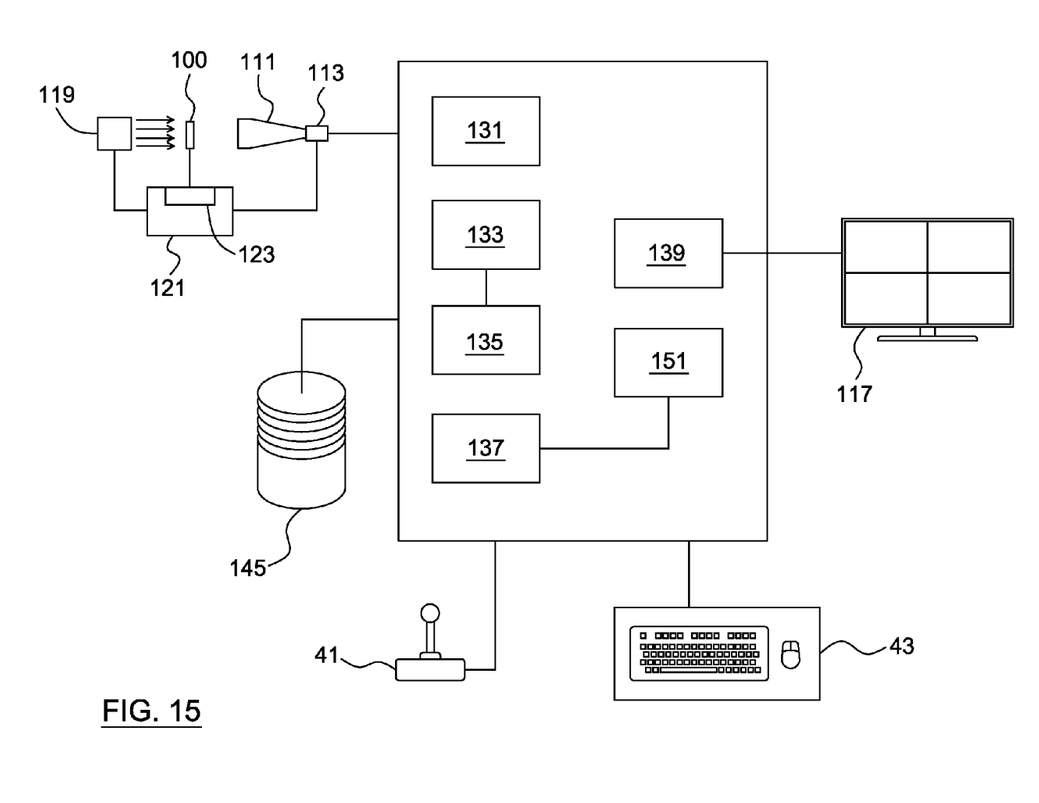
FIG. 15 is a schematic representation of a system used to carry out a preferred embodiment of the invention.

In a preferred embodiment, the system of the present invention includes a lens 111, a digital camera 113 and a computer, or other appropriate data processing system, 115 running the appropriate hardware and software to interface with the camera Since such a system is designed to study both small and large items, the system preferable includes one or more monitors 117. A preferred implementation provides for multiple monitors which allows the high-resolution image produced by the camera to be displayed fully (i.e. in 1:1 resolution on the bank of monitors, so that every pixel coming from the camera corresponds to a pixel on the bank of monitors, and allows for room for other windows).

Preferably, the system also includes illumination means 119 (either transmitted and/or reflected, for back- and/or front-illumination, respectively). Means 121 for mounting the camera, lens and illumination, such as brackets, hardware and structural elements are also provided, as are means 123 for mounting the part 100 between the camera and the lens.

The computer 115 is programmed with a variety of modules 131, 133, 135, 137, 139 and 151, only a portion of which are labeled on FIG. 15, for manipulating the signal received from the camera 113, performing edge detection or pattern recognition on the image, for obtaining the CAD drawing from database 145, and for performing the various calculations according to the invention.

The computer 115 further includes input devices 41, 43, such as a joystick or keyboard and mouse, for permitting the user to interact with the computer 115.

Other than for the specific computing functions described herein, computer 115 is programmed and functions as any other computing devices. Notwithstanding the generality of the preceding, a person skilled in the art will readily recognize that the system and method of the present invention can be implemented on a desktop system, a server system, a workstation system, or may even be deployed through an intranet or extranet.

In one aspect, the present invention concerns a system and method to automatically determine, in real-time, if the part matches its CAD data, to within user-specified tolerances, at specific locations. This will be referred to as the "Control Section-Based Auto Pass/Fail" scheme.

If a full part approach is required, the present invention concerns in another aspect a system and method to automatically determine, in real-time, if the part matches its CAD data, to within user-specified tolerances, across complete geometric objects. This will be referred to the "Geometry-Based Auto Pass/Fail" scheme.

These computational schemes are described below.

Control Section-Based Auto Pass/Fail

In summary, the Auto Pass/Fail scheme allows the user to setup "control sections". A control section is located at a single point, has an orientation and has a general bi-directional tolerance associated to it. A classic example of a bi-directional tolerance would be +0.005"/−0.001". Note that in the context of the present invention, there is no limitation as to the values of the bi-directional tolerance. The present invention supports so-called "plus/plus" tolerances (e.g. +0.005"/+0.001"), "minus/minus" tolerances (e.g. −0.001"/−0.005") as well as zero-valued tolerances (effectively: unidirectional tolerances—e.g. +0.005"/0" or 0"/−0.005"—or zero tolerances—e.g. +/−0"). Stated differently: so-called "plus/plus" tolerances occur when both of the tolerance limits are on the nominal's positive side. Inversely, both of the tolerance limits are on the negative side of the nominal in the case of "minus/minus" tolerances.

Control sections would typically (but not necessarily) be located directly on the CAD data and be normal to the CAD geometry at that location.

Figure 1:
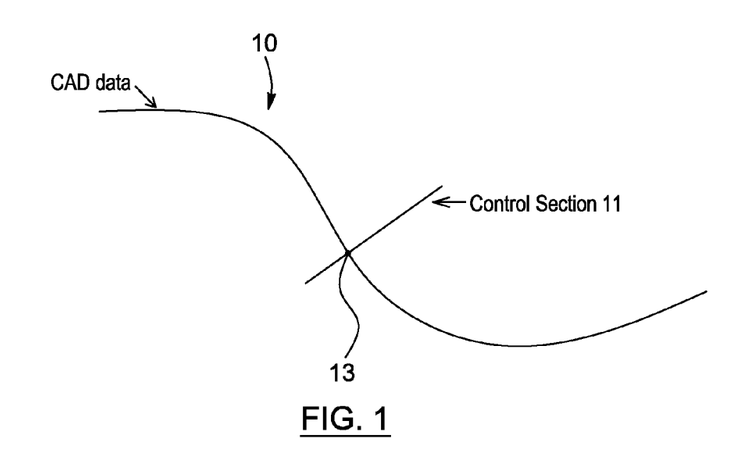
FIG. 1 is a schematic representation of a portion of a part illustrated in a CAD drawing, showing a line selected for a control section.

For example, FIG. 1 shows a portion 10 of a part as represented by a CAD drawing where a control section 11 has been placed. In a preferred embodiment, the control section 11 is normal to the CAD drawing, at the point 13 where the control section 11 is placed.

Figure 2:
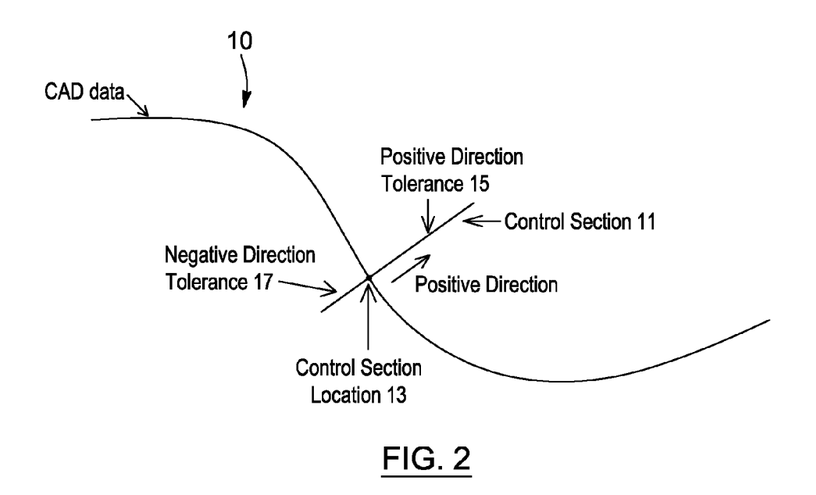
FIG. 2 additionally illustrates the positive direction tolerance, and negative direction tolerance.

FIG. 2 expands on FIG. 1, and for the purposes of calculating positive and negative deviations from normal, shows a positive direction tolerance 15 and a negative direction tolerance 17.

Setting Up Control Sections

Figure 4:
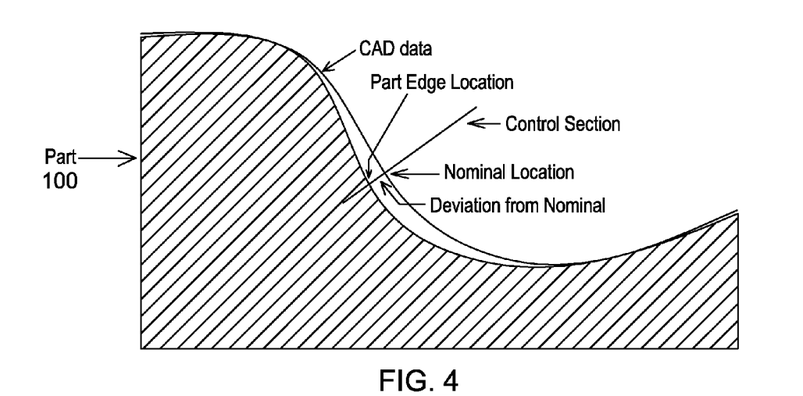
FIG. 4 shows where a deviation from nominal occurs between a part and a CAD drawing of the same part.

Many different approaches are possible to setup control sections 11. In a preferred embodiment, the approach to allow users to setup these control sections 11 manually is as follows:

Using the mouse or another pointing device 41, the user moves a pointer and a tracking cursor over the image of the part and the overlaid CAD data. The system then continuously and in real time locates the point 13 in the CAD data that is closest to the pointer. If the distance between this closest point and the pointer is less than a user-specified maximum distance (i.e. if the pointer is "in the neighborhood" of the CAD data) then the cursor "snaps" to this closest point. If not, the cursor's position is the same as the pointer's. The cursor moves with the pointer, snapping to the CAD data in this way until the user "sets" the point (by—for example—clicking on the mouse button). This determines the location of the control section 13. If the selected point is on the CAD data then in a preferred implementation, the system allows the user to automatically set the control section's orientation as being normal to the CAD data at that point. The user can then indicate which direction corresponds to the positive direction. Note that in the preferred implementation, the convention is that the positive direction is the direction away from the material in the case where the control section is being set on the outside edge of the part. FIG. 4 shows a detailed schematic representation of the part and the CAD data, and the deviation from normal (in this case, a negative deviation).

The user can then specify the control section's bi-directional tolerances described above.

There is no limit on the number of control sections that the present invention supports. Also, different control sections can obviously have different tolerance values.

Along with the ability to set up control sections manually as described above, it is also possible to supply to the pass/fail algorithm the control section information obtained from the CAD data itself via electronic file, for example.

Figure 3:
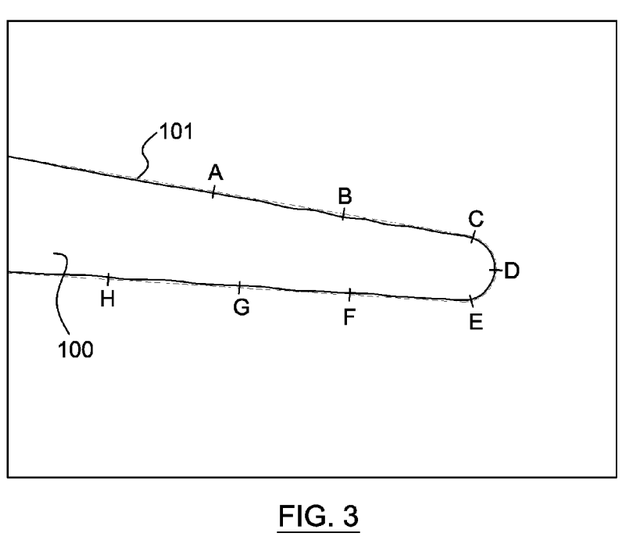
FIG. 3 shows a part on a display, where the CAD drawing is overlaid on the image of the part, and showing control section points A to H

FIG. 3 shows an example of control sections A to H being setup at locations in the CAD data that corresponds to the outside edge of a part 100. The dashed line 101 represents the CAD data.

Carrying Out Control Section-Based Auto Pass/Fail Calculations

With this control section information, the system of the invention can automatically determine, in real-time, if the part matches the CAD data to within the user-prescribed tolerances. Specifically, the system works on every image in the camera's live video stream (or still image) and, at every control section, determines the part's deviation from nominal. Considering the case where the control sections are setup on the CAD data at the nominal position of the part's outside edges, then the deviation from nominal is the difference (i.e. the distance away from the control section's location measured along the control section's direction) between the part's true position and its nominal position. The edge position can be obtained by using edge detection tools, for example. Pattern matching tools can also be used to obtain feature location. This can be especially useful when considering features with weak edges (a condition that is more frequent in the case of certain edges inside the part) or where there are many edges that can possibly "confuse" edge detection tools. A person skilled in the art will readily recognize that other approaches for edge and feature location are also possible.

The value of the deviation from nominal at every control section can be displayed to the user and continuously updated for every image in the case of a live video stream.

A pass/fail result is obtained at every control section by comparing the deviation from nominal against the tolerance range. If the deviation from nominal is within the user-prescribed tolerance range then this control section is said to "pass" and if it is not then it is said to "fail". By combining the pass/fail result of all of the control sections, an overall pass/fail result can be obtained. In most applications, the overall result is "pass" only when all of the control section results are "pass". However, in certain practical applications, an overall "pass" result can be obtained even in the presence of a certain (typically small) percentage of "failed" control sections.

In a preferred implementation, the pass fail result at every control section is shown using color coding (typically: red for fail and green for pass).

FIG. 4 shows how the deviation from nominal is obtained by measuring (in the image space) the distance along the control section between the part's location and its nominal location. The real-world value of the part's deviation from nominal at the control section is obtained by carrying out the inverse (i.e. image-space-to-CAD-space) transform of the distance measured on the image.

Figure 5:
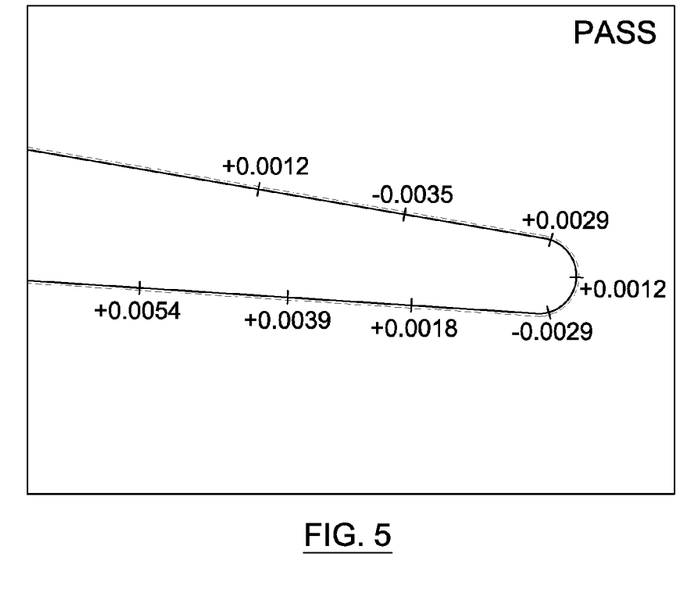
FIG. 5 shows a part with its CAD drawing overlaid thereon, where the part is determined to pass inspection given the deviation values at selected control points being below a predetermined threshold.

FIG. 5 shows an example the results of a control section-based auto pass/fail calculation, with the deviation from nominal at every control section.

Control sections can be positioned both inside and outside the system's optical field-of-view (which is especially useful in the case of parts that are larger than the field of view, for example). By having the CAD data (and the control section information, which is "tied" to it) "track the stage motion" (based on feedback from the stage's encoder) the part can be compared to the CAD data beyond the system's optical field of view.

In order to be able to carry out this automated control section-based part-to-CAD comparison, the part and the CAD data need to be aligned. This can be done manually or automatically.

Figure 12:
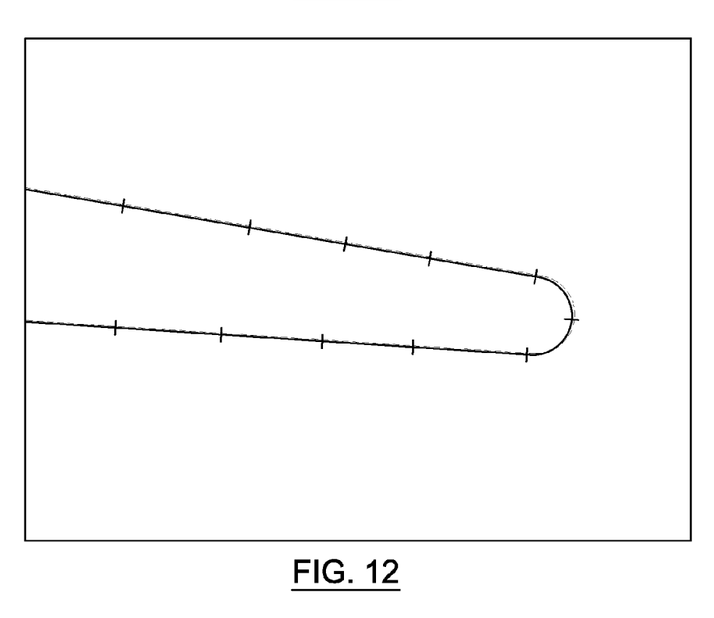
FIG. 12 shows a part with its CAD drawing overlaid thereon showing tolerance bands in conjunction with control sections.
Figure 13:
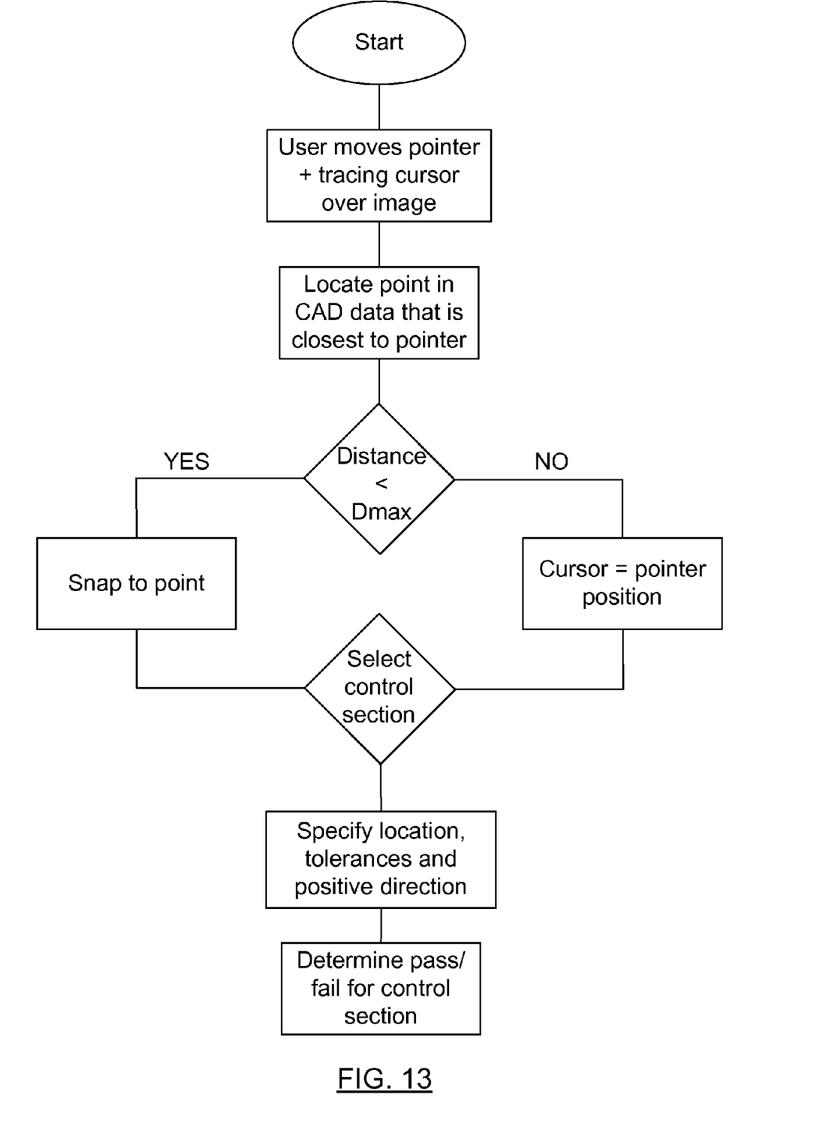
FIG. 13 is a schematic representation of the steps for performing a verification for a single control section on a part.

The following presents the principal steps involved in the control section-based auto pass/fail calculations according to a preferred embodiment of the invention (see FIG. 12):

As mentioned above, the user with a pointing device such as a mouse or a joystick, and input device such as a keyboard or touch screen, will enter the desired number of control sections as well as the various parameters for each control section, i.e. location, orientation, tolerance and positive direction.

In a preferred embodiment, the orientation will by default be normal to the CAD data at the control section, if applicable, but the system is adapted to receive a different orientation as specified by the user.

Once the control sections have been set, the system will apply the CAD overlay current translation, rotation and scaling to each control section geometry. In other words, the system applies a CAD-space to image-space transformation of the control section.

Thereafter, continuously for every image in the live video stream and for every control section, the system calculates the part's deviation from nominal at the location of the control section, and compares the deviation against the control section's tolerance. The tolerance can be user specified or mined from the CAD drawing itself The system thus produces a pass/fail result for the control section.

The system then determines an overall pass/fail result based on a combination of each individual pass/fail result for each control section of a given part.

Of course, the threshold for individual pass/fail and overall pass/fail are predetermined by the user, and will change from part to part, and even within a part, tolerances can be different.

Geometry-Based Auto Pass/Fail

The above control section-based auto pass/fail scheme produces very accurate results at each of the control sections and has the advantage of being very computationally efficient. However, it provides incomplete coverage of the part. There is thus a risk of producing so-called false-pass results. This would be the case if the part were out-of-tolerance at some point where no control section is defined.

Figure 6:
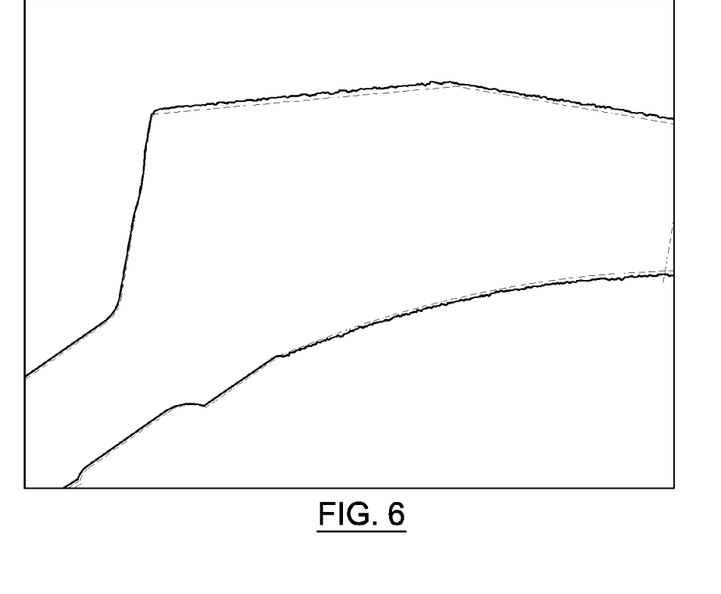
FIG. 6 shows a part with its CAD drawing overlaid thereon, where the upper portion of the part is not smooth, but rather presents a jagged edge.

FIG. 6 shows an example of a feature that is ill-suited to the control section-based approach (because the feature of interest on the part has many very significant "peaks and valleys").

Another example of a problematic situation is a machined part with "flashing".

To address this shortcoming, the present invention proposes a calculation scheme which is an extension to the above scheme and that automatically provides coverage of entire geometric entities at full resolution, referred to as "Geometry-Based Auto Pass/Fail".

In this case, the user selects complete geometric components (such as LINE, ARC, ELLIPSE, SPLINE, CIRCLE, POLYLINE, LWPOLYLINE ENTITIES as well as any other CAD geometric component).

Figure 7:
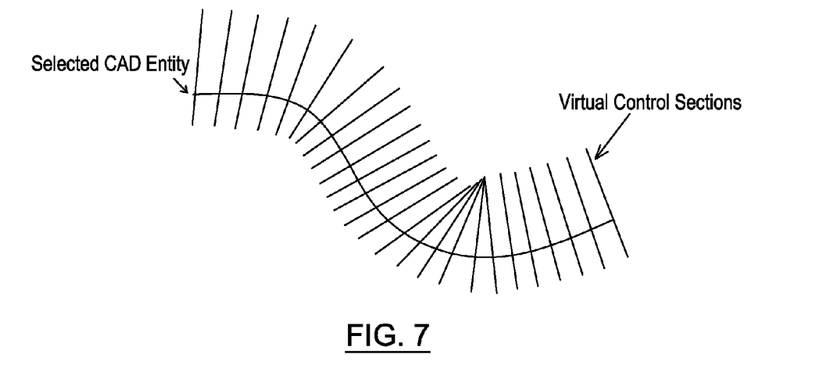
FIG. 7 shows a portion of a CAD drawing and a plurality of virtual control sections for evaluating geometry of the part.

Many different approaches are possible to define the geometry to be used for auto pass/fail calculations. In a preferred implementation, when the user is defining the geometry to be used for this auto pass/fail analysis, a "snap to CAD" capability analogous the one described above is provided, except that in this case the user is allowed to select the entire geometric object closest to the pointer (and still within the pointer's "neighborhood"), instead of a single point. Once a geometric object is selected, the system creates "virtual" control sections at a density that corresponds to a coefficient times the CAD-space (or: real-world) equivalent of the pixel-to-pixel distance. The orientation of each one of these virtual control sections is set as normal to the geometric object at the virtual control section's position (see FIG. 7).

With a density coefficient of 1.0 this approach ensures that the resolution of the auto pass/fail analysis corresponds to the system's full resolution.

The density coefficient is included in the case where the user wishes to consider a coarser virtual control section density (which corresponds to a coefficient value greater than 1.0). This provides the benefit of speeding up calculations significantly (there is a linear relationship between the speedup and the value of the coefficient), while maintaining a more-than-acceptable resolution (e.g., in many practical situations, if an out-of-tolerance condition occurs only over a distance of one or two pixels, for example, users will often want to disregard it anyway . . . ).

Note also that it makes no sense to use a coefficient value of less than 1.0 as the resolution of the overall pass/fail result would continue to be limited by the system's resolution. In this case, the finer virtual control section resolution would provide no benefit but would of course increase computational cost.

As in the case of the control section based scheme, the positive direction needs to be indicated and the bi-directional tolerances need to be set. Note, however, that in the case of the geometry-based auto pass/fail scheme, tolerances can be variable along a geometric object (a common example is when tolerances vary linearly along a geometric object). Stated differently: there is no requirement that all of the virtual control sections along a geometric object have the same tolerances values.

Figure 9:
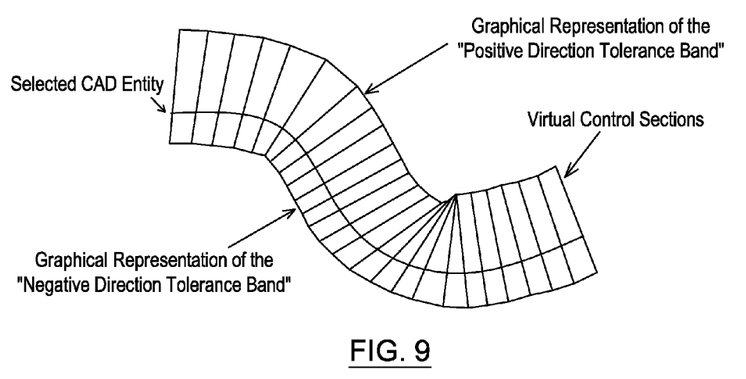
FIG. 9 shows the positive direction tolerance band and negative direction tolerance band for the portion of the CAD drawing of FIG. 7.
Figure 10:
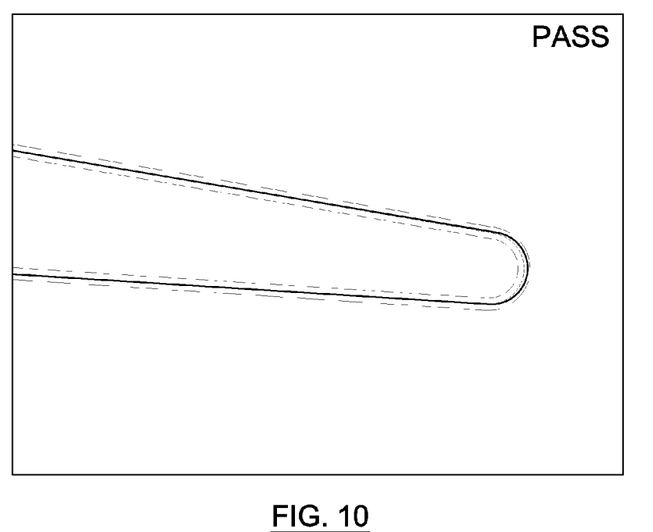
FIG. 10 shows a part with its CAD drawing overlaid thereon, where the part is determined to pass inspection given that the part is within the positive and negative direction tolerance bands for a whole geometry.

FIG. 9 shows how virtual control sections are automatically created along a geometric entity (a SPLINE entity), with the spacing between neighboring virtual control sections being a function of the density coefficient and the image space pixel spacing.

Figure 8:
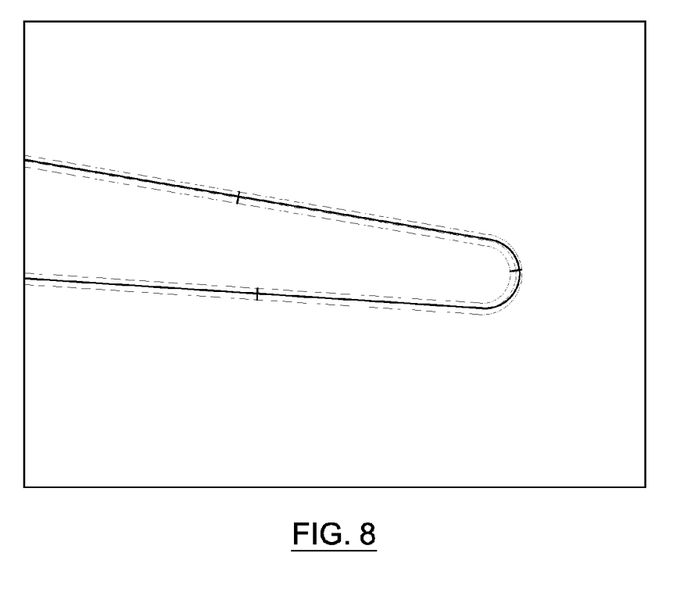
FIG. 8 shows a part with a portion of a CAD drawing overlaid thereon, showing different tolerance bands for different portions of the part.

FIGS. 8 and 9 illustrate "tolerance bands" drawn along a line between the tips of all of the neighboring virtual control sections, along both the positive tolerance direction and the negative tolerance direction. This representation effectively shows the "tolerance band" along each selected geometric object.

Carrying Out Geometry-Based Auto Pass/Fail Calculations

With the geometry information setup as described above, the geometry-based auto pass/fail algorithm can automatically determine, in real-time and at every virtual control section, if the part matches the CAD data to within the user-prescribed tolerances. This result is obtained at every virtual control section in the same manner as described above for the control section based approach. And, as previously, this geometry-based approach works on every image in the camera's live video stream. And, also as previously, deviations from nominal (typically, but not necessarily, the maximum positive deviation and the maximum negative deviation from nominal over a geometric object as well as their location) can be displayed to the user and continuously updated for every image in the live video stream. Also as previously, the preferred implementation uses color coding to indicate the location of in- and out-of-tolerance conditions. And as previously, the pass/fail result from all of the virtual control sections can be combined to produce an overall pass/fail result. And again as previously: virtual control sections can be positioned both inside and outside the system's optical field-of-view.

Figure 11:
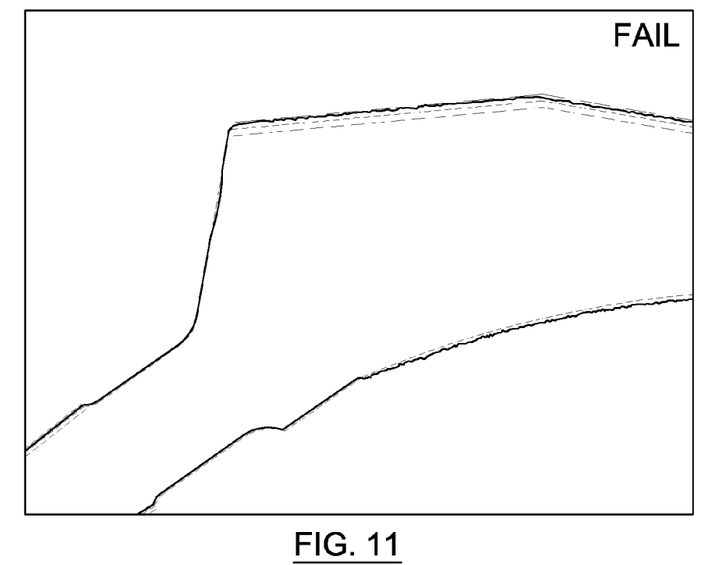
FIG. 11 shows a part with its CAD drawing overlaid thereon, where the part is determined to fail inspection given that portions of the part are outside the positive direction tolerance bands for a whole geometry.

FIGS. 11 and 12 show examples of the results of geometry-based auto pass/fail calculations.

In order to be able to carry out this automated geometry-based part-to-CAD comparison, the part and the CAD data need to be aligned. This can be done manually or automatically.

Figure 14:
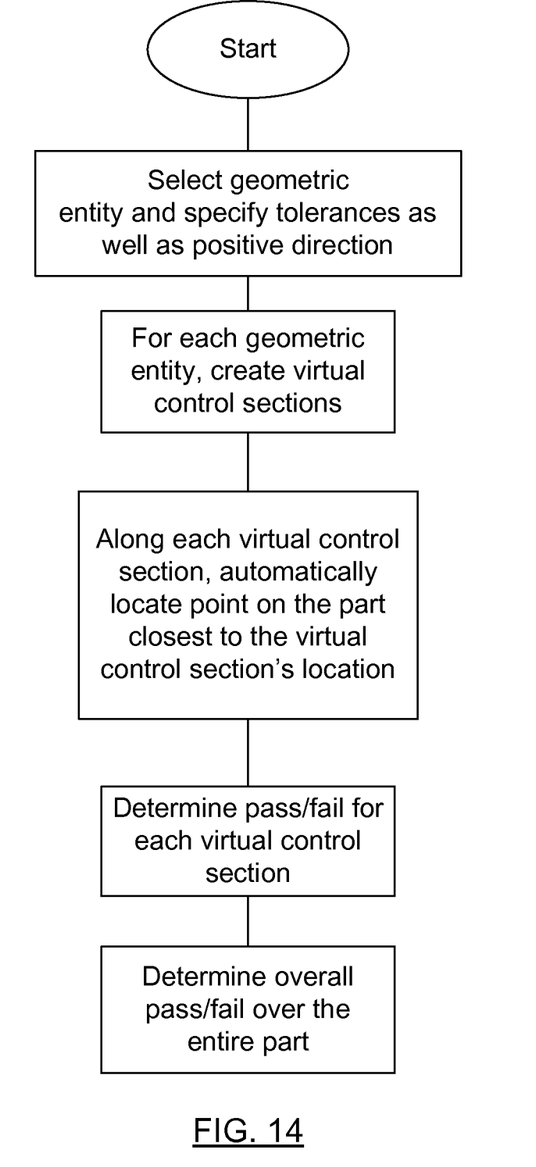
FIG. 14 is a schematic representation of the steps for performing verification for a geometric entity.

The principal steps involved in the geometry-based auto pass/fail calculations are similar to those described above for the control-based method, with the appropriate modifications, as detailed below (see FIG. 14).

The user will set up the environment by specifying the number of geometric entities, and for each entity will specify the geometry: tolerances (constant or variable along the entity), density coefficient and positive direction.

Once the entities are defined, virtual control sections are created within the entity with a resolution (i.e. spacing) determined by the density coefficient. Thereafter, the pass/fail computations as described above are performed for each virtual control section, and an overall pass/fail determination is made.

The examples and descriptions above all relate to two-dimensional comparisons between the part and its CAD data. It is important to note, however, that both schemes can be extended to the third dimension (to compare depth and height at various points along the part, for example) using classic LASER triangulation, for example.

Additionally, the present description has been made in reference to a system which includes a display for displaying in real time an image stream obtained from the camera, or a still image obtained from the camera. A person skilled in the art will recognize that the invention can be practiced without the display system. Indeed, a still image of the part can be stored in memory, and the image manipulations can be performed within the memory. All that is required is that the system be provided with the control points and/or the geometric shape to study. A person skilled in the art will further appreciate that the present system can be implemented in a manufacturing process, where each part, or portion of a part, can be inspected as they are conveyed from one area to another. Such an implementation can further include a control system connected to the conveyor, for example, and be operatively connected thereto to "reject" the parts that are outside of the predetermined tolerance values. This implementation would greatly increase the manufacturing throughput in that it would not be necessary to remove a part from the manufacturing line, place it in an inspection area, inspect the part, and then accept or reject it. The system of the present invention can be seamlessly integrated with the appropriate imaging equipment connected to a processing unit as described herein.

Although the present invention has been described by way of a preferred embodiment thereof, it should be understood that any modifications thereto within the scope of the appended claims are within the present invention.

What is claimed is:

1. In a system for visually comparing a part to a drawing of said part in computer memory or on a screen, the system comprising a camera for capturing either a single image or an image stream of said part, a computing module for receiving the image or image stream, for obtaining, scaling, positioning displaying said drawing of said part on a display unit and for overlaying the drawing on the image or image stream, a method for determining if a part is manufactured within predefined tolerances at least one control section, the method comprising the steps of:
   a. defining at least one control section, and for each control section determining the geometry thereof;
   b. performing a computer-aided-design-space (CAD-space) to image-space transformation of each control section;
   c. calculating a deviation between the CAD drawing and the part at each control section;
   d. providing a user with an indication of the deviation between the CAD drawing and the part at each control section;
   e. comparing the deviation to a predetermined tolerance in order to determine if the part at each control section is within the predetermined tolerance; and
   f. providing a user with an indication of the determination of each control section being within the predetermined tolerance.

2. A method according to claim 1, wherein said step d) includes the step of visually displaying the indication on said display unit.

3. A method according to claim 1, wherein said step f) includes the step of visually displaying the indication on said display unit.

4. A method according to claim 2, wherein said indication is green for a control section that is within tolerance and red for a control section that is out of tolerance.

5. A method according to claim 3, wherein said indication is green for a control section that is within tolerance and red for a control section that is out of tolerance.

6. A method according to claim 1, further comprising presenting the user with an overall pass/fail indication, based on a combination of each pass/fail determination for each control section.

7. In a system for visually comparing a part to a drawing of said part in computer memory or on a screen, the system comprising a camera for capturing either a single image or an image stream of said part, a computing module for receiving the image or image stream, for obtaining, scaling, positioning and displaying said drawing of said part on a display unit and for overlaying the drawing on the image or image stream, a method for determining if a part is manufactured within predefined tolerances at least one geometric object, the method comprising the steps of:
   a. defining at least one geometric entity, and for each entity defining a geometry thereof, said geometry including a density coefficient;
   b. defining a plurality of virtual control sections within each of said geometric entity, said plurality of virtual control sections being a function of said density coefficient;
   c. for each virtual control section, determining the geometry thereof;
   d. performing a computer-aided-design-space (CAD-space) to image-space transformation of each virtual control section;

e. calculating a deviation between the CAD drawing and the part at each virtual control section;

f. providing the user with either an indication of the deviation between the CAD drawing and the part at each virtual control section or an indication of the minimum and maximum deviations between the CAD drawing and the part over the geometric entity and the location on the geometric entity of these minimum and maximum deviations;

g. comparing the deviation to a predetermined tolerance in order to determine if the part at each virtual control section is within the predetermined tolerance; and h. providing a user with an indication of the determination of each virtual control section being within the predetermined tolerance.

8. A method according to claim 7, wherein said step f) includes the step of visually displaying the indication on said display unit.

9. A method according to claim 7, wherein said step h) includes the step of visually displaying the indication on said display unit.

10. A method according to claim 8, wherein said indication is green for a virtual control section that is within tolerance and red for a virtual control section that is out of tolerance.

11. A method according to claim 9, wherein said indication is green for a virtual control section that is within tolerance and red for a virtual control section that is out of tolerance.

12. A method according to claim 7, further comprising presenting the user with an overall pass/fail indication, based on a combination of each pass/fail determination for each virtual control section.

13. A system for visually comparing a part to a drawing of said part, the system being adapted to receive a single image or an image stream of said part, said system comprising:

a module for receiving the image or image stream, for obtaining, scaling, positioning and displaying said drawing of said part on a display unit and for overlaying the drawing on the image or image stream;

an input device for defining at least one control section on at least one point of said part, and for each control section determining the geometry thereof;

a calculating module for performing a computer-aided-design-space (CAD-space) to image-space transformation of each control section;

a calculating module for calculating a deviation between the CAD drawing and the part at each control section;

an output device for providing a user with an indication of the deviation between the CAD drawing and the part at each control section; and a comparator for comparing the deviation to a predetermined tolerance in order to determine if the part at each control section is within the predetermined tolerance, wherein said output device provides a user with an indication of the determination of each control section being within the predetermined tolerance.

14. A system for visually comparing a part to a drawing of said part in computer memory or on a screen, the system being adapted to receive a single image or an image stream of said part, said system comprising:

a module for receiving the image or image stream, for obtaining, scaling, positioning and displaying said drawing of said part on a display unit and for overlaying the drawing on the image or image stream;

an input device for defining at least one geometric entity, and for each entity defining a geometry thereof, said geometry including a density coefficient;

means for defining a plurality of virtual control sections within each of said geometric entity, said plurality of virtual control sections being a function of said density coefficient;

for each virtual control section, means for determining the geometry thereof;

means for performing a computer-aided-design-space (CAD-space) to image-space transformation of each virtual control section;

means for calculating a deviation between the CAD drawing and the part at each virtual control section;

means for providing the user with either an indication of the deviation between the CAD drawing and the part at each virtual control section or an indication of the minimum and maximum deviations between the CAD drawing and the part over the geometric entity and the location on the geometric entity of these minimum and maximum deviations;

means for comparing the deviation to a predetermined tolerance in order to determine if the part at each virtual control section is within the predetermined tolerance; and means for providing a user with an indication of the determination of each virtual control section being within the predetermined tolerance.

15. In a system for comparing a part to a drawing of said part, the system comprising a camera for capturing either a single image or an image stream of said part, a computing module for receiving the image or image stream, for obtaining, scaling, and positioning said drawing of said part and for overlaying the drawing on the image or image stream, a method for determining if a part is manufactured within predefined tolerances at least one control section, the method comprising the steps of:

defining at least one control section, and for each control section determining the geometry thereof;

performing a computer-aided-design-space (CAD-space) to image-space transformation of each control section;

calculating a deviation between the CAD drawing and the part at each control section;

providing an indication of the deviation between the CAD drawing and the part at each control section; and comparing the deviation to a predetermined tolerance in order to determine if the part at each control section is within the predetermined tolerance.

16. A method according to claim 15, wherein said step a) is preceded by a step of selecting a geometric shape of said part, and wherein said step a) further defines a plurality of control sections according to a predetermined density for said geometric shape.

17. A method according to claim 16, wherein said step b) further includes the step of defining a positive and negative tolerance band, and wherein said step e) further includes providing an indication of the deviation between the CAD drawing and said geometric shape.

* * * * *